US011954765B2

(12) United States Patent
Lim et al.

(10) Patent No.: US 11,954,765 B2
(45) **Date of Patent: *Apr. 9, 2024**

(54) APPLYING RANDOM PATCHES TO PIXEL BLOCK OF AN IMAGE UTILIZING DIFFERENT WEIGHTS

(71) Applicant: SAMSUNG ELECTRONICS CO., LTD., Suwon-si (KR)

(72) Inventors: Hyungjun Lim, Suwon-si (KR); Taegyoung Ahn, Suwon-si (KR); Youngsu Moon, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 41 days.

This patent is subject to a terminal disclaimer.

(21) Appl. No.: 17/580,753

(22) Filed: Jan. 21, 2022

(65) Prior Publication Data

US 2022/0148235 A1 May 12, 2022

Related U.S. Application Data

(63) Continuation of application No. 16/399,018, filed on Apr. 30, 2019, now Pat. No. 11,443,461.

(51) Int. Cl.

| | |
|---|---|
| ***G06T 11/00*** | (2006.01) |
| ***G06T 5/20*** | (2006.01) |
| ***H04N 7/015*** | (2006.01) |

(52) U.S. Cl.

CPC ............. *G06T 11/001* (2013.01); *G06T 5/20* (2013.01); *H04N 7/0155* (2013.01)

(58) Field of Classification Search

CPC ........ G06T 11/001; G06T 5/20; H04N 7/0155

See application file for complete search history.

(56) References Cited

U.S. PATENT DOCUMENTS

| | | | |
|---|---|---|---|
| 6,522,766 | B1 | 2/2003 | Ratnakar |
| 8,675,999 | B1 | 3/2014 | Liang et al. |

(Continued)

FOREIGN PATENT DOCUMENTS

| | | | |
|---|---|---|---|
| CN | 102713971 | A | 10/2012 |
| CN | 103020897 | A | 4/2013 |

(Continued)

OTHER PUBLICATIONS

Communication dated Feb. 23, 2022 issued by the Indian Patent Office for Indian Patent Application No. 202117021926.

(Continued)

*Primary Examiner* — Pakee Fang

(74) *Attorney, Agent, or Firm* — Sughrue Mion, PLLC

(57) ABSTRACT

Disclosed is an image processing apparatus and a method of operating the same. The image processing apparatus includes: a memory storing information on at least one random patch; and at least one processor configured to: obtain correlations between a pixel block included in an input image and each of a plurality of random patches obtained from the information on the at least one random patch, obtain weights respectively for the plurality of random patches on a basis of the obtained correlations and apply the weights respectively to the plurality of random patches, and obtain an output image by applying, to the pixel block, the plurality of random patches to which the weights are respectively applied.

16 Claims, 18 Drawing Sheets

720

502 520 500

(56) References Cited

U.S. PATENT DOCUMENTS

| | | | |
|---|---|---|---|
| 8,693,804 B2 | 4/2014 | Kawata et al. | |
| 9,633,417 B2 | 4/2017 | Sugimoto et al. | |
| 9,679,370 B2 | 6/2017 | Shibata et al. | |
| 2003/0206662 A1 | 11/2003 | Avinash et al. | |
| 2005/0146539 A1* | 7/2005 | Zhu | G06T 11/001 345/639 |
| 2007/0217502 A1 | 9/2007 | Ammar et al. | |
| 2013/0011077 A1 | 1/2013 | Kawata et al. | |
| 2014/0029849 A1 | 1/2014 | Sen et al. | |
| 2014/0093185 A1 | 4/2014 | Liang et al. | |
| 2015/0093015 A1* | 4/2015 | Liang | G06F 18/24 382/154 |
| 2015/0302566 A1 | 10/2015 | Shibata et al. | |
| 2016/0086317 A1 | 3/2016 | Oron et al. | |
| 2016/0093032 A1* | 3/2016 | Lei | G06T 5/50 382/264 |
| 2017/0140514 A1 | 5/2017 | Amirghodsi | |
| 2017/0206632 A1* | 7/2017 | Milanfar | G06T 3/4053 |
| 2018/0068634 A1 | 3/2018 | Yoo et al. | |
| 2018/0096488 A1 | 4/2018 | Xie et al. | |
| 2018/0232853 A1 | 8/2018 | Kim et al. | |
| 2018/0255320 A1* | 9/2018 | Sarwer | H04N 19/86 |
| 2019/0333190 A1* | 10/2019 | Schroers | G06T 5/002 |
| 2019/0378242 A1 | 12/2019 | Zhang | |

FOREIGN PATENT DOCUMENTS

| | | |
|---|---|---|
| CN | 104969257 A | 10/2015 |
| CN | 105046664 A | 11/2015 |
| CN | 105574821 A | 5/2016 |
| EP | 3 341 911 B1 | 2/2020 |
| JP | 5181821 B2 | 4/2013 |
| KR | 10-2018-0027885 A | 3/2018 |
| KR | 10-2018-0097342 A | 8/2018 |
| WO | 2014087652 A1 | 6/2014 |
| WO | 2017/003240 A1 | 1/2017 |
| WO | 2018048171 A1 | 3/2018 |

OTHER PUBLICATIONS

Communication dated Apr. 20, 2021 issued by the European Intellectual Property Office in counterpart European Application No. 21153072.0.

Office Action dated Dec. 31, 2020 by the China National Intellectual Property Administration in corresponding Chinese Application No. 201910669892.7.

Communication dated Apr. 14, 2020 issued by the Japanese Intellectual Property Office in counterpart Japanese Application No. 2019-153784.

Communication dated Oct. 29, 2019 issued by the Japanese Patent Office in counterpart Japanese Application No. 2019-153784.

International Search Report (PCT/ISA/210) dated Dec. 18, 2019 issued by the International Searching Authority in International Application No. PCT/KR2019/010488.

Written Opinion (PCT/ISA/237) dated Dec. 18, 2019 issued by the International Searching Authority in International Application No. PCT/KR2019/010488.

Communication dated Aug. 16, 2019, issued by the European Search Report in counterpart European Application No. 19172062.2.

* cited by examiner

FIG. 3

| 6 | 2 | -12 | 10 |
|---|---|---|---|
| 12 | -18 | -16 | 18 |
| -6 | -20 | 20 | -2 |
| -10 | 24 | 16 | -24 |

R[0]

| -18 | -20 | 18 | 16 |
|---|---|---|---|
| 12 | 20 | -12 | -24 |
| 24 | -16 | -6 | 10 |
| -10 | -2 | 2 | 6 |

R[1]

| -20 | 12 | 6 | -12 |
|---|---|---|---|
| -18 | -2 | -24 | 20 |
| 24 | 16 | 10 | 2 |
| 18 | -16 | -10 | -6 |

R[2]

FIG. 5B $$W_0 \times \begin{bmatrix} 6 & 2 & -12 & 10 \\ 12 & -18 & -16 & 18 \\ -6 & -20 & 20 & -2 \\ -10 & 24 & 16 & -24 \end{bmatrix} + W_1 \times \begin{bmatrix} -18 & -20 & 18 & 16 \\ 12 & 20 & -12 & -24 \\ 24 & -16 & -6 & 10 \\ -10 & -2 & 2 & 6 \end{bmatrix} + W_2 \times \begin{bmatrix} -20 & 12 & 6 & -12 \\ -18 & -2 & -24 & 20 \\ 24 & 16 & 10 & 2 \\ 18 & -16 & -10 & -6 \end{bmatrix} = \begin{bmatrix} t_1 & t_2 & t_3 & t_4 \\ t_5 & t_6 & t_7 & t_8 \\ t_9 & t_{10} & t_{11} & t_{12} \\ t_{13} & t_{14} & t_{15} & t_{16} \end{bmatrix}$$

R[0] R[1] R[2] 520

APPLYING RANDOM PATCHES TO PIXEL BLOCK OF AN IMAGE UTILIZING DIFFERENT WEIGHTS

CROSS-REFERENCE TO RELATED APPLICATION

This application is a continuation application of U.S. patent application Ser. No. 16/399,018, filed Apr. 30, 2019, which is based on and claims priority under 35 U.S.C. § 119 to Korean Patent Application No. 10-2018-0170914, filed on Dec. 27, 2018, in the Korean Intellectual Property Office, the disclosures of which are incorporated herein in their entirety by reference.

BACKGROUND

1. Field

The disclosure relates to an image processing apparatus and a control method thereof, and more particularly, to an image processing apparatus that restores a texture component of an input image and an image processing method thereof.

2. Description of the Prior Art

With the development of electronic technology, various types of electronic apparatuses have become widespread. Image processing apparatuses, used in various places such as a home, an office, a public place, and the like, have been increasingly developed in recent years.

Furthermore, in recent years, high definition display panels such as 4K ultra high definition (UHD) televisions (TV) have emerged and are become widespread. However, high quality and high definition content may be considerably insufficient. Therefore, there is a need for various techniques for generating high definition content from low definition content. Further, the texture of the content may be lost due to image compression techniques or standards such as MPEG/H.264/HEVC. Therefore, there is a need for technology that restores the lost texture component.

The above information is presented as background information only to assist with an understanding of the disclosure. No determination has been made, and no assertion is made, as to whether any of the above might be applicable as prior art with regard to the disclosure.

SUMMARY

Provided are an image processing apparatus capable of improving fineness of an image by generating texture of a texture-lost image due to an image enlargement, an image compression, and the like, and an image processing method thereof According to an embodiment, there is provided an image processing apparatus which includes: a memory configured to store information on at least one random patch; and at least one processor configured to: obtain correlations between a pixel block included in an input image and each of a plurality of random patches obtained from the information on the at least one random patch, obtain weights respectively for the plurality of random patches on a basis of the obtained correlations and apply the weights respectively to the plurality of random patches, and obtain an output image by applying, to the pixel block, the plurality of random patches to which the weights are respectively applied.

Each of the plurality of random patches may include a plurality of pseudo random numbers, and an average of the plurality of pseudo random numbers included in each of the plurality of random patches may be zero.

A part of the plurality of pseudo random numbers may include positive pseudo random numbers that are obtained by adding at least one integer selected from an integer set consisting of 0 and 2^n (n≥0), and a remainder of the plurality of pseudo random numbers may include negative pseudo random numbers having absolute values equivalent to the positive pseudo random numbers.

The information on the at least one random patch may include a plurality of pseudo random numbers to be used for generating one random patch, and the at least one processor may be further configured to obtain the plurality of random patches by changing an order of the plurality of pseudo random numbers used in the generated one random patch.

The at least one processor may be further configured to: obtain a first weight on a basis of a correlation between the pixel block and a first random patch, among the plurality of random patches, and obtain a second weight on a basis of a correlation between the pixel block and a second random patch, among the plurality of random patches; multiply the first random patch by the first weight and multiply the second random patch by the second weight; and obtain the output image by applying, to the pixel block, the first random patch multiplied by the first weight and the second random patch multiplied by the second weight.

The at least one processor may be further configured to: apply the first random patch to the pixel block so that a random value at a first position included in the first random patch is added to a first pixel included in the pixel block; and apply the second random patch to the pixel block so that a random value at the first position included in the second random patch is added to the first pixel included in the pixel block.

The at least one processor may be further configured to: obtain a texture patch by adding a first random value included in a first position of the first random patch multiplied by the first weight and a second random value at the first position of the second random patch multiplied by the second weight, and adding a third random value included in a second position of the first random patch multiplied by the first weight and a fourth random value included in the second position of the second random patch multiplied by the second weight; and obtain the output image by applying the texture patch to the pixel block.

The at least one processor may be further configured to obtain the output image by applying frequency filtering to the obtained texture patch and applying, to the pixel block, the texture patch to which the frequency filtering is applied.

The output image may be a 4K ultra high definition (UHD) image or an 8K UHD image.

The image processing apparatus may further include a display, and the at least one processor may control the display to display the output image.

According to an embodiment, there is provided an image processing method of an image processing apparatus, the method including: obtaining correlations between a pixel block included in an input image and each of a plurality of random patches obtained from information on at least one random patch; obtaining weights respectively for the plurality of random patches on a basis of the obtained correlations and applying the weights respectively to the plurality of random patches; and obtaining an output image by applying, to the pixel block, the plurality of random patches to which the weights are respectively applied.

According to an embodiment, there is provided anon-transitory computer-readable recording medium that stores computer instructions that allow an image processing apparatus to perform operations when the computer instructions are executed through a processor of the image processing apparatus, the operations including: obtaining correlations between a pixel block included in an input image and each of a plurality of random patches obtained from information on at least one random patch; obtaining weights respectively for the plurality of random patches on a basis of the obtained correlations and applying the weights respectively to the plurality of random patches; and obtaining an output image by applying, to the pixel block, the plurality of random patches to which the weights are respectively applied.

According to an embodiment, there is provided an image processing apparatus including: a memory storing a plurality of random patches; and at least one processor configured to: obtain a first correlation between a pixel block included in an input image and a first random patch, among the plurality of random patches, obtain a second correlation between the pixel block and a second random patch, among the plurality of random patches, obtain a first weight on a basis of the first correlation and a second weight on a basis of the second correlation, and obtain an output image by applying, to the pixel block, the first random patch to which the first weight is applied and the second random patch to which the second weight is applied.

Additional aspects will be set forth in part in the description which follows and, in part, will be apparent from the description, or may be learned by practice of the presented embodiments.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 3 is a view illustrating an example of a random patch according to an embodiment;

FIG. 5B is a view provided to describe a method for obtaining a texture patch according to an embodiment;

DETAILED DESCRIPTION

Figure 1:
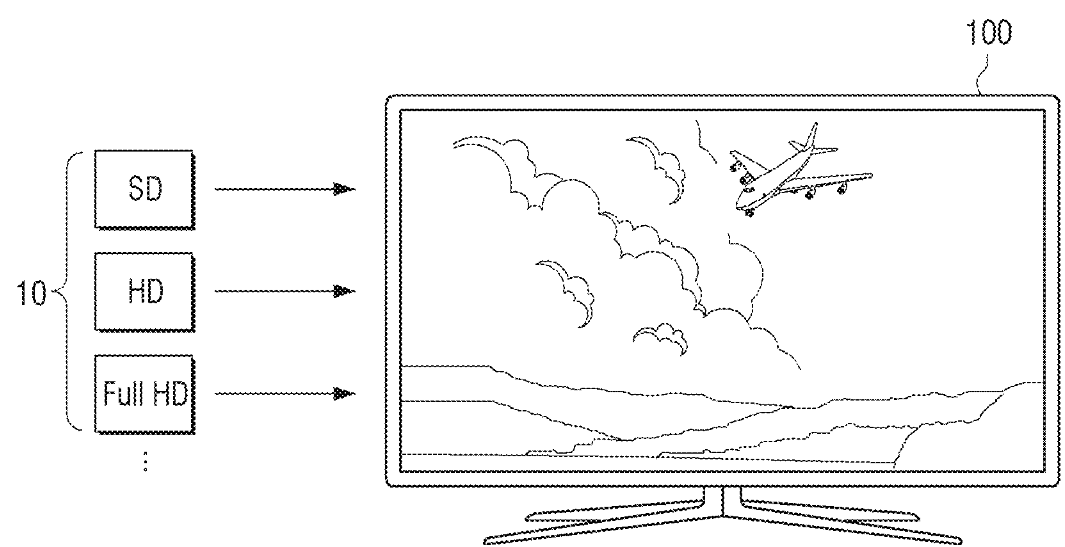
FIG. 1 is a view illustrating an implementation example of an image processing apparatus according to an embodiment.

Hereinafter, embodiments will be described more fully with reference to the accompanying drawings, in which the embodiments are shown to understand a configuration and an effect of the present inventive concept(s). Aspects may, however, be embodied and modified in many different forms and should not be construed as limited to embodiments set forth herein. To more clearly describe features of embodiments, detailed description for contents widely known to those skilled in the art will be omitted for clarity.

Unless otherwise described, any portion including any element may refer to the portion further including other elements, i.e., not excluding the other elements. Various elements and regions in the drawings may be schematically drawn. Accordingly, the technical concept(s) is not limited by a relative size or spacing drawn in the accompanying drawings.

Hereinafter, an embodiment will be described in detail with reference to the accompanying drawings.

FIG. 1 is a diagram illustrating an implementation example of an image processing apparatus 100 according to an embodiment.

An image processing apparatus 100 may be implemented with a TV as illustrated in FIG. 1, but is not limited thereto. Any apparatus having a display function (such as a smart phone, a tablet personal computer (PC), a laptop computer, a head-mounted display (HMD), a near eye display (NED), a large format display (LFD), a digital signage, a digital information display (DID), a video wall, a projector, etc.) may be applied as the image processing apparatus 100. Further, it is understood that the image processing apparatus 100 may be any device that processes image data and outputs the image data to a display (e.g., external display), such as a set-top box, an audio/video receiver, a video receiver, a media streaming device, an optical recording media reproducing device, a media storage device, etc.

The image processing apparatus 100 may receive various types of resolution images or various types of compressed images. For example, the image processing apparatus 100 may receive any of or at least one of a standard definition (SD) image, a high definition (HD) image, a full HD image, and an ultra HD (UHD) image. The image processing apparatus 100 may receive an image in a compressed format such as MPEG (for example, MP2, MP4, MP7, and the like), advance video coding (AVC), H.264, high efficiency video coding (HEVC), etc.

Even in the case where the image processing apparatus 100 is implemented with a UHD TV according to an embodiment, there is not a large quantity of native UHD content available. Thus, a user must frequently watch an SD image, an HD image, a full HD image, and the like (hereinafter, referred to as low resolution image 10) through the UHD TV. At this time, a method of converting the input low resolution image to a UHD image (hereinafter, referred to as high resolution image) may be implemented. However, the texture of the converted image is blurred in the image enlargement process and, thus, fineness may be degraded. The texture of the image may refer to a unique pattern or shape of an area regarded as having a same feature (or feel) in the image. Even when the high resolution image is input according to another method, the texture loss due to image compression may be caused and the fineness may be degraded. Further, data size of a digital image increases as the number of pixels is increased. Therefore, a large amount of data may be compressed, and the texture loss due to data compression may inevitably increase.

Hereinafter, methods of improving fineness of an image by restoring a texture component lost due to various reasons described above, according to various embodiments, will be described.

Figure 2:
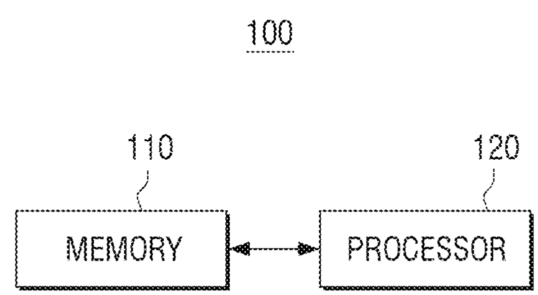
FIG. 2 is a block diagram illustrating a configuration of an image processing apparatus according to an embodiment.

FIG. 2 is a block diagram illustrating a configuration of an image processing apparatus 100 according to an embodiment.

Referring to FIG. 2, the image processing apparatus 100 may include a memory 110 and a processor 120.

The memory 110 is electrically connected to the processor 120 and may store data used in implementing various embodiments. For example, the memory 110 may be implemented as an internal memory such as a read-only memory (ROM) (e.g., electrically erasable programmable read-only memory (EEPROM)) and random access memory (RAM)) or may be implemented as a memory separate from the processor 120. In this case, the memory 110 may be implemented as a memory embedded in the image processing apparatus 100, or may be implemented as a detachable memory in the image processing apparatus 100, according, for example, to the data usage purpose. For example, data for driving the image processing apparatus 100 may be stored in a memory embedded in the image processing apparatus 100, and data for an additional function of the image processing apparatus 100 may be stored in the memory detachable to the image processing apparatus. A memory embedded in the image processing apparatus 100 may be a volatile memory such as a dynamic random access memory (DRAM), a static random access memory (SRAM), a synchronous dynamic random access memory (SDRAM), or a nonvolatile memory such as one time programmable ROM (OTPROM), programmable ROM (PROM), erasable and programmable ROM (EPROM), electrically erasable and programmable ROM (EEPROM), mask ROM, flash ROM, a flash memory (for example, NAND flash or NOR flash), a hard disk drive or a solid state drive (SSD). A memory detachably mounted to the image processing apparatus 100 may be implemented as a memory card (for example, a compact flash (CF), secure digital (SD), micro secure digital (micro-SD), mini secure digital (mini-SD), extreme digital (xD), multi-media card (MMC), etc.), an external memory (for example, a universal serial bus (USB) memory) connectable to a USB port, or the like.

According to an embodiment, the memory 110 may store information about at least one random patch. Since the term "patch" is a term applied for convenience in consideration of function or form, various terms other than "patch" may be used with respect to an embodiment. For example, because each patch has a structure in which a plurality of patch values are arranged in a matrix form of a pixel unit, the term "patch" may be referred to as a "mask" in consideration of this form.

Here, the information on the at least one random patch may include random values used to generate at least one random patch. In this case, the random values may be pseudo random numbers. A pseudo random number is a number generated by a mechanism (pseudo random number generator) that has already been determined using the initial value given at the beginning. For example, the pseudo random number used in the random patch according to an embodiment may include at least one integer selected from the set of integers consisting of 0 and $2^n$ ($n \geq 1$). It is understood, however, that one or more other embodiments are not limited thereto. For example, according to another embodiment, the pseudo random number used in the random patch may include at least one integer selected from an integer set of 0 and $3^n$ ($n \geq 1$). That is, the pseudo random number used in the random patch may be generated by a suitable initial value and mechanism that may simplify the operation of the processor 120. Other details of the random patch are described below.

The processor 120 may be electrically connected to the memory 110 and control an overall operation of the image processing apparatus 100.

The processor 120 according to an embodiment may be implemented with at least one of a digital signal processor (DSP), a microprocessor, and a timing controller (TCON) that process a digital image signal, although it is understood that one or more other embodiments are not limited thereto. The processor 120 may include one or more among a central processing unit (CPU), a micro controller unit (MCU), a micro processing unit (MPU), a controller, an application processor (AP), a communication processor (CP), and an advanced reduced instruction set computing (RISC) machine (ARM) processor or may be defined as a corresponding term. Further, the processor 120 may be implemented in a system on chip (SoC) type or a large scale integration (LSI) type in which a processing algorithm is built therein or in a field programmable gate array (FPGA) type.

The processor 120 processes an input image to obtain an output image. Specifically, the processor 120 may perform texture improvement processing on the input image to obtain an output image. Here, the output image may be an Ultra High Definition (UHD) image, for example, a 4K UHD image or an 8K UHD image, but is not limited thereto.

For this purpose, the processor 120 may obtain a plurality of random patches to be used for texture improvement processing. To be specific, the processor 120 may obtain a plurality of random patches based on the random values used to generate the at least one random patch. Here, the random value may be a pseudo random number as described above. In this case, for the at least one random patch, the memory 110 may store only random values used for generating at least one random patch, and a very small storage space may be used.

The processor 120 may obtain a required or suitable number of random numbers based on the size of the random patches, and may generate a plurality of random patches based on the obtained random numbers. Here, the reference random patch may be of n * n format. For example, the size of the random patch may be 4 * 4, but it is not limited thereto, and may be implemented in various sizes such as 3 * 3, 5 * 5, and the like in one or more other embodiments.

Hereinafter, for convenience of description, it is assumed that a random patch is implemented in a size of 4 * 4. For example, if the reference random patch is implemented as a 4 * 4 size, then 16 pseudo random numbers may be used.

According to an embodiment, the random numbers used to generate the random patch may be selected from a set of integers consisting of 0 and 2^n (n≥0). For example, at least a part (for example, ½) of the random numbers may include positive random numbers that are obtained by adding at least one integer selected from the group of integers A={0, 1, 2, 4, 8, 16, 32, . . . } consisting of 0 and 2^n (n≥0), and the remainder of the random numbers may include negative random numbers having an absolute value that is equal to the positive random numbers. Accordingly, the average of the plurality of random numbers included in the random patch may be 0.

By way of example, after at least one integer is selected from the set of integers A={0, 1, 2, 4, 8, 16, 32, . . . }, the corresponding integers are added to generate the random numbers. For example, the following random numbers may be generated.

0=0
1=2^0
2=2^1
3=2^1+2^0
4=2^2
5=2^2+2^0
6=2^2+2^1
8=2^3
9=2^3+2^0
10=2^3+2^1
12=2^3+2^2
16=2^4
17=2^4+2^0
18=2^4+2^1
20=2^4+2^2
24=2^4+2^3
32=2^5

The processor 120 may generate random numbers in the same manner as described above, and generate a plurality of random patches using the generated random numbers. For example, in the case of generating N random patches having a size of width W and height H, first, positive (+) random numbers of W * H/2 may be generated, negative random numbers in which a negative sign (−) is appended to the positive (+) random numbers may be added, and then a set of random numbers with a total of W * H numbers may be generated. The processor 120 generates N random patches by mixing the random numbers included in the random number set in N different orders. Therefore, the random numbers included in each random patch may be the same values, with only different arrangement (order) by patches. In this way, it is possible to generate N random patches with a mean of 0 and the same standard deviation but different forms (shapes). This is purposed to maintain brightness of the entire image so as to be kept unchanged even when pixel values are changed, if random patches are added to the image. Here, the average may be calculated based on an average formula of various mathematical meanings such as a geometric mean and a harmonic mean, and as an example, an average value may be calculated based on the arithmetic mean. Also, the equal standard deviation means, for example, when the predetermined standard deviation value is cr, the equation −σ≤k≤σ (where k is the standard deviation of the random patch) is satisfied.

In one or more embodiments, the processor 120 may store the generated plurality of random patches in the memory 110 and use the random patches as needed or periodically. In one or more other embodiments, the processor 120 may store, for the random patches, only the random numbers to be used for generation of a random patch, and may generate a plurality of random patches as needed or periodically.

Further, in one or more embodiments, the memory 110 may store ordering information for generating a plurality of random patches from a plurality of random values, in which case the processor 120 may generate a plurality of random patches based on the ordering information. A plurality of random patches may be generated by randomly changing the order of a plurality of random values, according to an embodiment.

FIG. 3 is a view illustrating an example of a random patch according to an embodiment.

According to an embodiment, as shown in FIG. 3, when generating a 4 * 4 random patch, 8 random numbers may be generated. For example, it is assumed that random numbers of {2, 6, 10, 12, 16, 18, 20, 24} are generated. If negative random numbers corresponding to such positive random numbers are added, a set of random numbers {2, 6, 10, 12, 16, 18, 20, 24, −2, −6, −10, −20, −24} is generated. It is possible to generate various random patches such as R[0], R[1], and R[2] shown in the figure by changing the arrangement of the random numbers differently. Here, the arrangement of the random numbers to generate different random patches may be changed randomly. In some cases, however, it is also possible to change the arrangement of random numbers by applying some predetermined scheme, such as a predetermined ordering scheme.

Returning to FIG. 2, when a plurality of random patches are obtained, the processor 120 may obtain similarity information between each of the obtained plurality of random patches and a pixel block (hereinafter referred to as a target pixel block) included in the input image. Here, the similarity information may be a correlation (or a correlation degree or an association degree) between each of the plurality of random patches and the pixel blocks included in the input image. Here, the correlation is calculated as a constant value, meaning that the two variables x and y are assumed to be related to each other, and the degree of the relation may be indicated as a value called a correlation coefficient. For example, the correlation coefficient may be indicated as a value between −1.0 and +1.0, and the greater the absolute value of the number irrespective of the sign, the higher the relation it has. For example, a negative (−) value may indicate a negative correlation, and a positive (+) value may indicate a positive correlation.

By way of example, if the pixel value included in the target pixel block in the input image is I=[i0, . . . , in-1], and the random number included in the random patch R[n] is R[n]=[r0, r1 , . . . , rn-1], then the correlation value C[n] may be obtained as E[I * R [n]]=Σii * ri. [68] Alternatively, if the mean of the pixel values included in the target pixel value is m(I), and the mean of the random numbers included in the random patch R[n] is m(R[n]), the relation value may be obtained based on Equation 1 below:

$$C[n]=E[(I-m(I))(R[n]-mR[n])] \quad \text{[Equation 1]}$$

In this case, the average of each random patch is 0, Equation 1 may be expressed as Equation 2 shown below:

$$C[n]=E[I^*R[n]]-E[I^*m(R[n])]=E[I^*R[n]] \quad \text{[Equation 2]}$$

According to an embodiment, when a pseudo random number is used, a multiplication operation may be replaced with a bit-shift and an addition operation in calculating a correlation between a target pixel block and a random patch.

For example, when the random number 12 is used, the calculation of multiplying the pixel value "a" included in the target pixel block by the random number 12 is replaced with "(a«3)+(a«2)" instead of "a×12". The bit-shift operation and the addition operation have much less complexity than the multiplication operation in hardware implementation and thus, the operational complexity may be significantly reduced. In addition, since the corresponding calculation method may be used in the process of multiplying the weight corresponding to each of the plurality of random patches as described below, the operational complexity may be significantly reduced.

The processor 120 may obtain the weight respectively corresponding to a plurality of random patches based on the obtained correlation.

By way of example, the processor 120 may obtain the correlation value obtained for each of the plurality of random patches as the weight corresponding to each random patch. As another example, the processor 120 may obtain a value obtained by multiplying the correlation value obtained for each of the plurality of random patches by a predetermined proportional constant, as a weight corresponding to each random patch. For example, the processor 120 may obtain a weight in the range of 0 to 1 based on the correlation value obtained for each of the plurality of random patches. For example, if the weight 0 is applied to the random patch, the corresponding random patch is not added to the target pixel area. In this case, there is a high possibility that the correlation with respect to all the random patches would be very low in a flat area or an area including strong edge, and thus, no texture is generated. In this case, it is possible to prevent a ringing phenomenon that may occur in the edge area, and it is possible to prevent unnecessary texture from being added to the flat area.

According to another embodiment, similarity information between each of a plurality of random patches and the target pixel block may be obtained by various cost functions, distinct from the correlation described above. For example, as the cost function for determining similarity, mean square error (MSE), sum of absolute difference (SAD), median absolute deviation (MAD), etc., may be used. For example, when the MSE is applied, the MSE of the target pixel block may be calculated, and the degree of similarity between the target pixel block and each random patch may be obtained from the perspective of MSE. Here, a similarity weight may be determined based on the MSE difference.

The processor 120 may apply an obtained weight to each of a plurality of random patches, apply a weighted random patch to a target pixel block, and obtain an output image. For example, the processor 120 may obtain a first weight based on a correlation between a target pixel block and a first random patch, and obtain a second weight based on a correlation between the pixel block and the second random patch. By multiplying the first random patch by the first weight, multiplying the second random patch by the second weight, and applying the first random patch multiplied by the first weight and the second random patch multiplied by the second weight to the target pixel block, an output image may be obtained.

According to an embodiment, the processor 120 may generate a texture by adding a plurality of weighted random patches, and obtain an output image by applying the generated texture to a target pixel block. For example, the processor 120 may add the first random value (that is, the random number value) included in the first random patch multiplied by the first weight and the second random value included in the second random patch multiplied by the second weight and add the third random value included in the first random patch multiplied by the first weight and the fourth random value included in the second random patch multiplied by the second weight, to obtain a texture patch. Here, the second random value included in the second random patch may be a random value at a position corresponding to the first random value in the first random patch. The fourth random value included in the fourth random patch may be a random value at a position corresponding to the third random value in the third random patch. The processor 120, then, may obtain an output image by applying (for example, adding) the texture patch to the target pixel block.

Figure 4A:
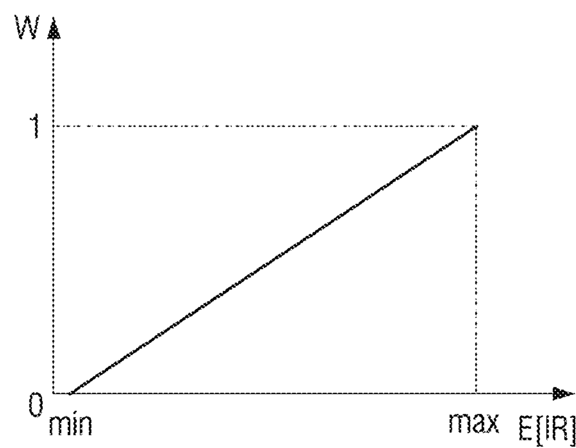
FIG. 4A is a view provided to describe a method for obtaining a weight according to an embodiment.
Figure 4B:
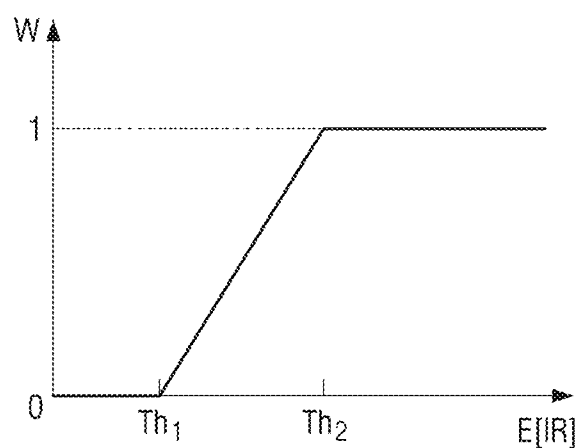
FIG. 4B is a view provided to describe a method for obtaining a weight according to another embodiment.
Figure 4C:
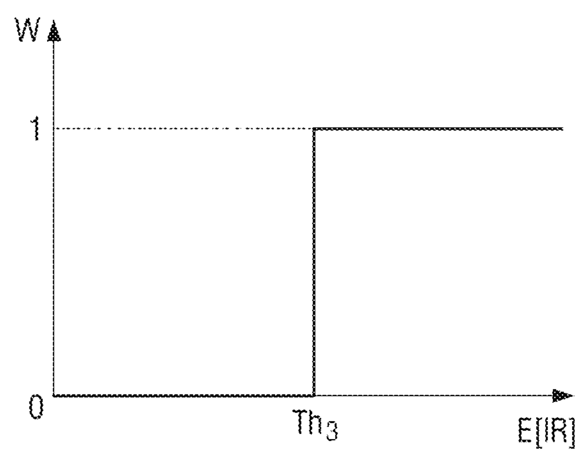
FIG. 4C is a view provided to describe a method for obtaining a weight according to still another embodiment.

According to another embodiment, the processor 120 may sequentially apply each of the plurality of weighted random patches to the target pixel block and obtain an output image including a texture. For example, the processor 120 may apply the first random patch to the target pixel block so that a random value at a first position included in the first random patch is added to the first pixel included in the target pixel block, and apply the second random patch to the pixel block so that a random value at a second position included in the second random patch is added to the first pixel included in the target pixel block. Here, the second position in the second random patch may be a position corresponding to the first position in the first random patch. FIGS. 4A to 4C are views provided to describe a method for obtaining the weight according to various embodiments.

According to an embodiment, as shown in FIG. 4A, the weight may be determined in a linearly increasing manner in a predetermined range, such as in a range of 0 to 1 according to the correlation value E[IR]. For example, when the correlation value E[IR] is the minimum among the plurality of correlation values, the weight is determined as 0, when the correlation value E[IR] is the maximum, the weight is determined as 1, and when the correlation value E[IR] is between the minimum and maximum values, the weight may be determined to be linearly increasing. In this case, the minimum value and the maximum value may be a minimum value and a maximum value among a plurality of correlation values calculated by a specific target pixel block. In this case, different weights may be applied to the same correlation value for each pixel block. It is understood, however, that one or more other embodiments are not limited thereto. For example, a minimum value (for example, 0) and a maximum value (for example, 100) may be determined for all the pixel blocks of the input image. In this case, if the correlation values are the same in all the pixel blocks, the same weight may be applied.

According to another embodiment, as shown in FIG. 4B, when the correlation value E[IR] is less than the first threshold value Th1, the weight is determined to be 0, and when the correlation value is equal to or greater than the second threshold value Th2, the weight is determined to be 1. In a range that the correlation value E[IR] is equal to or greater than the first threshold value Th1 and less than the second threshold value Th2, the weight may be determined to be linearly increasing. In this case, the first threshold Th1 and the second threshold Th2 may be set to the same value for all the pixel blocks, although it is understood that one or more other embodiments are not limited thereto. For example, the first threshold value Th1 and the second threshold value Th2 may be set to different values for each pixel block.

According to another embodiment, when the correlation value E[IR] is less than the third threshold value Th3 as shown in FIG. 4C, the weight may be determined as 0, and when the correlation value is equal to or greater than the third threshold value Th3, the weight may be determined as 1. In this case, only a random patch of which the correlation value is equal to or greater than the third threshold Th3 may be used as a texture. Here, the third threshold value Th3 may be set to the same value for all the pixel blocks, although it is understood that one or more other embodiments are not limited thereto. For example, it is also possible that the third threshold value Th3 is set to a different value for each pixel block.

Figure 5A:
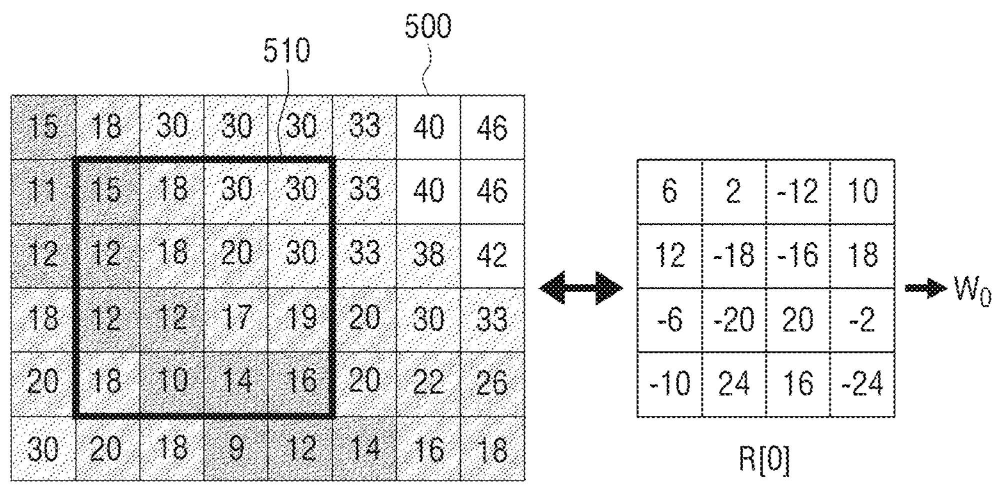
FIG. 5A is a view provided to describe a method for obtaining a weight according to an embodiment.
Figure 5A:
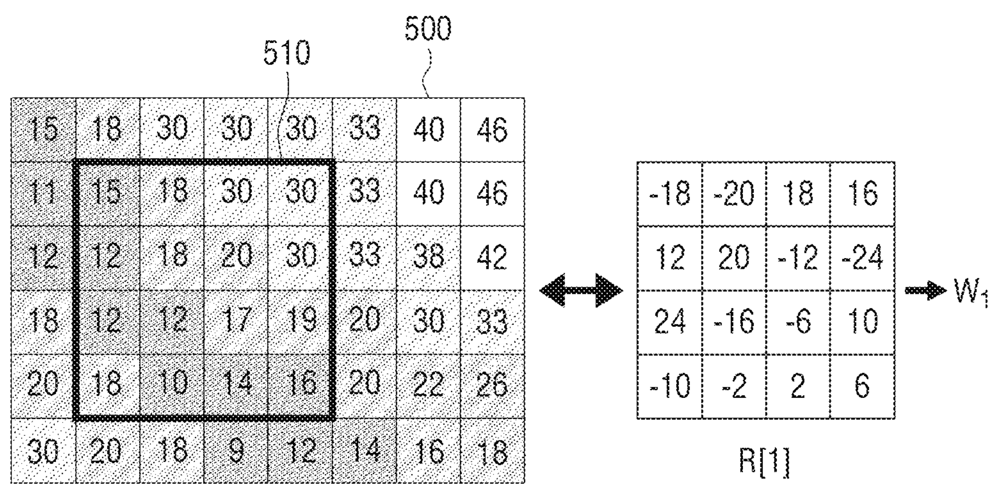
Figure 5A:
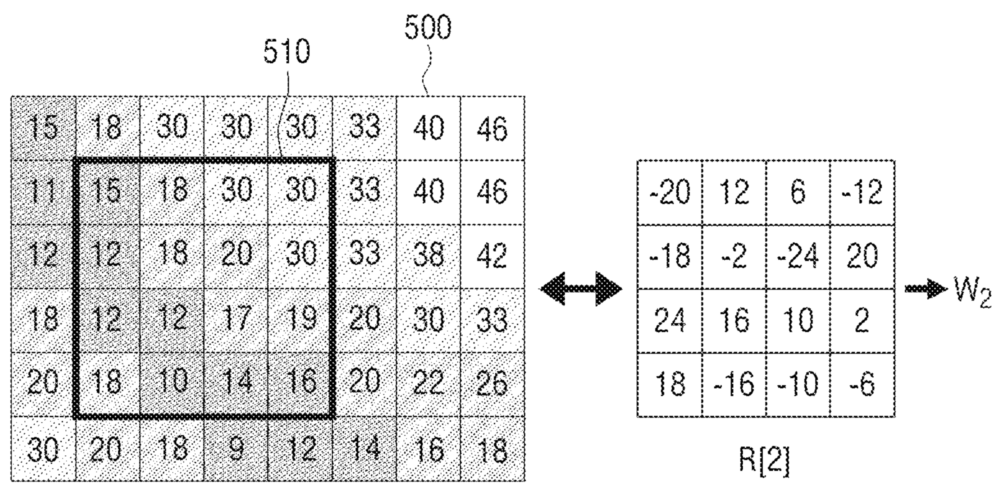

FIG. 5A is a view provided to describe a method for obtaining a weight according to an embodiment, and FIG. 5B is a view provided to describe a method for obtaining a texture patch according to an embodiment.

As shown in FIG. 5A, the processor 120 may obtain the weight w0 corresponding to the first random patch R[0] based on a correlation between a target pixel block 510 included in an input image 500 and a first random patch R[0]. In addition, the processor 120 may obtain a weight w1 corresponding to the second random patch R[1] based on a correlation between the target pixel block 510 and the second random patch R[1]. The processor 120 may also obtain a weight w2 corresponding to the third random patch R[3] based on a correlation between the target pixel block 510 and the third random patch R[2].

As shown in FIG. 5B, the processor 120 may generate a texture patch by multiplying the first random patch R[0] by the weight w0 corresponding to the first random patch R[0], multiplying the second random patch R[1] by the weight w1 corresponding to the second random patch R[1], multiplying the third random patch R[2] by the weight w2 corresponding to the third random patch R[2], and then adding the weighted first through third random patches. Specifically, the processor 120 may obtain the position value t1 at (1,1) of the texture patch 520 by adding w0 * 6 which is the position value at (1,1) of the weighted first random patch R[0], wl * (−18) which is the position value at (1,1) of the weighted second random patch R[1], and w2 * (−20) which is the position value at (1,1) of the weighted third random patch R[2]. The remaining position values of the texture patch 520 may also be obtained by adding the corresponding position values of each random patch multiplied by the weight. For example, the processor 120 may store the weighted first random patch R[0] in the memory 110, overlap the weighted second random patch R[1] to the patch stored in the memory 110 and store the same, and overlap the weighted third random patch R[3] to the patch stored in the memory 110 and store the same, to obtain the texture patch. Here, the meaning of overlapping and storing may be a method of adding the values of the corresponding positions of the respective random patches.

Figure 6A:
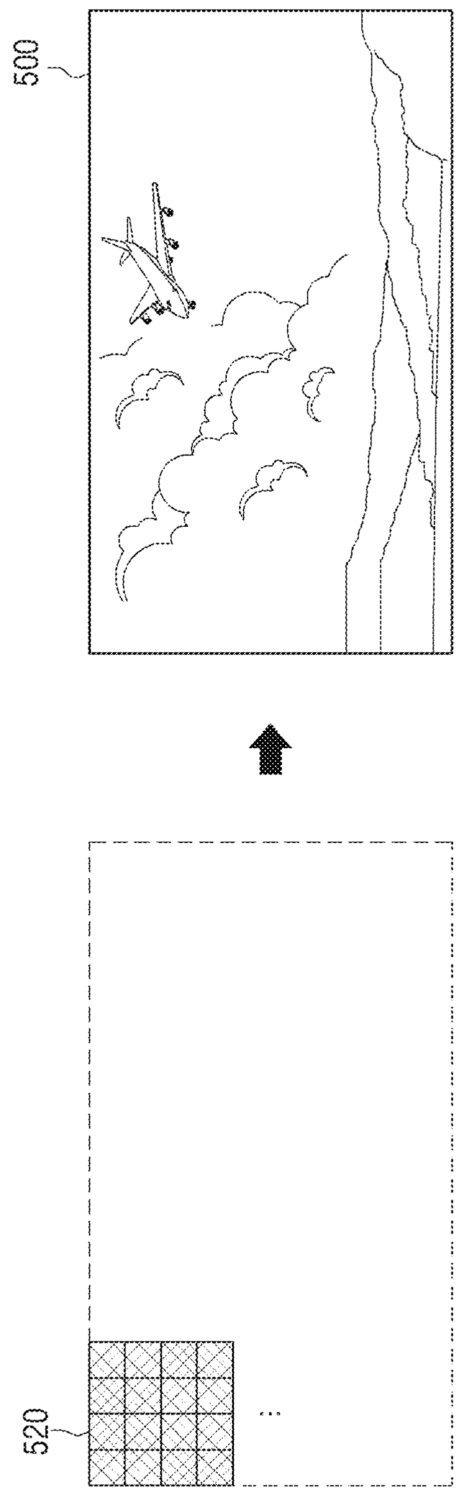
FIG. 6A is a view provided to describe a method for obtaining an output image according to an embodiment.
Figure 6B:
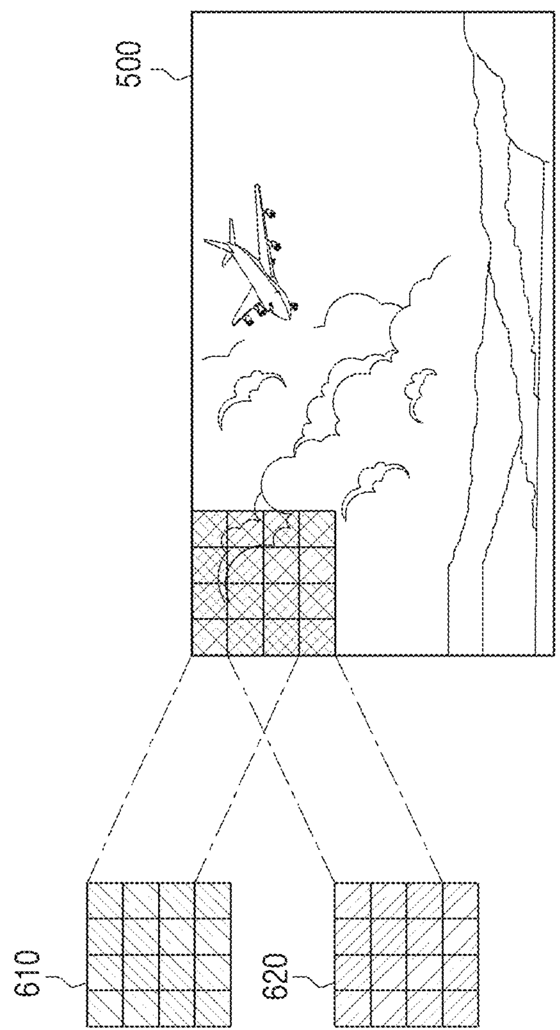
FIG. 6B is a view provided to describe a method for obtaining an output image according to another embodiment.

FIGS. 6A and 6B are views provided to describe a method for obtaining an output image according to an embodiment.

FIG. 6A is a view provided to describe a method for obtaining a texture corresponding to an input image 500 and applying the obtained texture to the input image 500 according to an embodiment.

Referring to FIG. 6A, the processor 120 may generate the texture patch 520 corresponding to the target pixel block by the method shown in FIG. 5B, and apply the generated texture patch 520 to the target pixel area. Specifically, the processor 120 may add a value included in a corresponding area of the texture patch 520 to each pixel value included in the target pixel area. However, it is understood that one or more other embodiments are not limited thereto, and additional processing other than or in addition to simple addition may be performed.

As described above, the processor 120 may set a target pixel block with respect to all the pixels included in the input image 500, sequentially apply a corresponding texture, and obtain a corrected image.

FIG. 6B is a view provided to describe a method for applying a random patch applied with a weight to an input image 500 on a real time basis according to another embodiment.

Referring to FIG. 6B, the processor 120 may sequentially apply a weighted plurality of random patches 610 and 620 to the target pixel block to obtain an output image including a texture. For example, the processor 120 may apply the weighted first random patch 610 to the target pixel area, and apply the weighted second random patch 620 to the target pixel area to which the weighted first random patch 610 is applied. Here, the application may be a method of adding a value included in a corresponding area of a plurality of random patches 610 and 620 to which weight is applied to pixel values included in the target pixel area. However, it is understood that one or more other embodiments are not limited thereto, and additional processing other than or in addition to simple addition may be performed.

As described above, the processor 120 may set a target pixel block with respect to all the pixels included in the input image, sequentially apply the corresponding random patch, and obtain a corrected image.

Figure 7A:
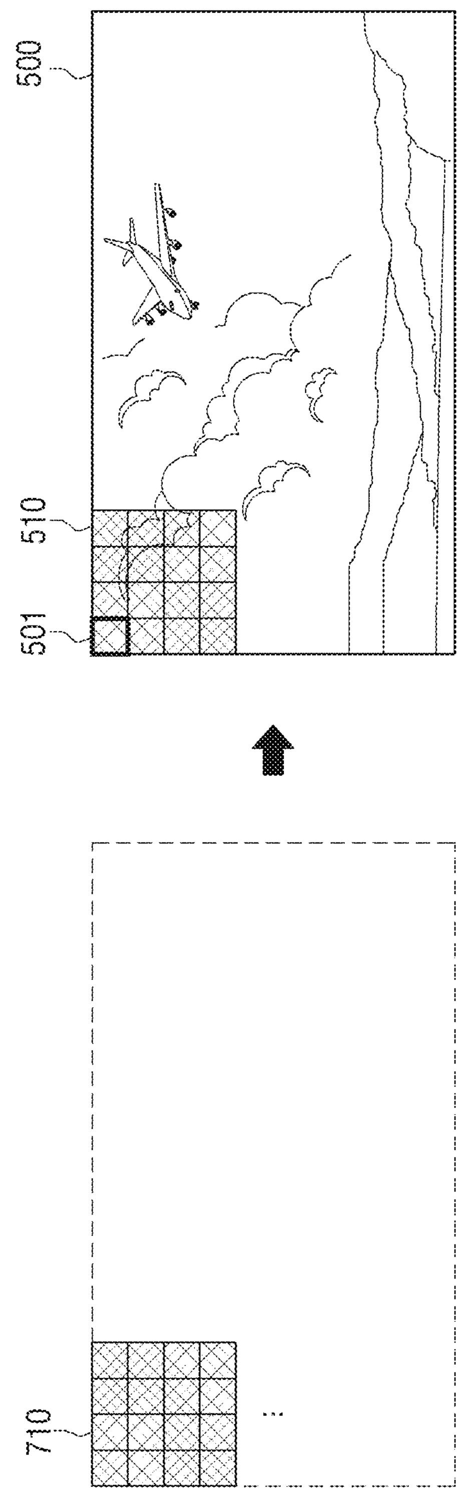
FIG. 7A is a view provided to describe a method for obtaining an output image according to still another embodiment.
Figure 7B:
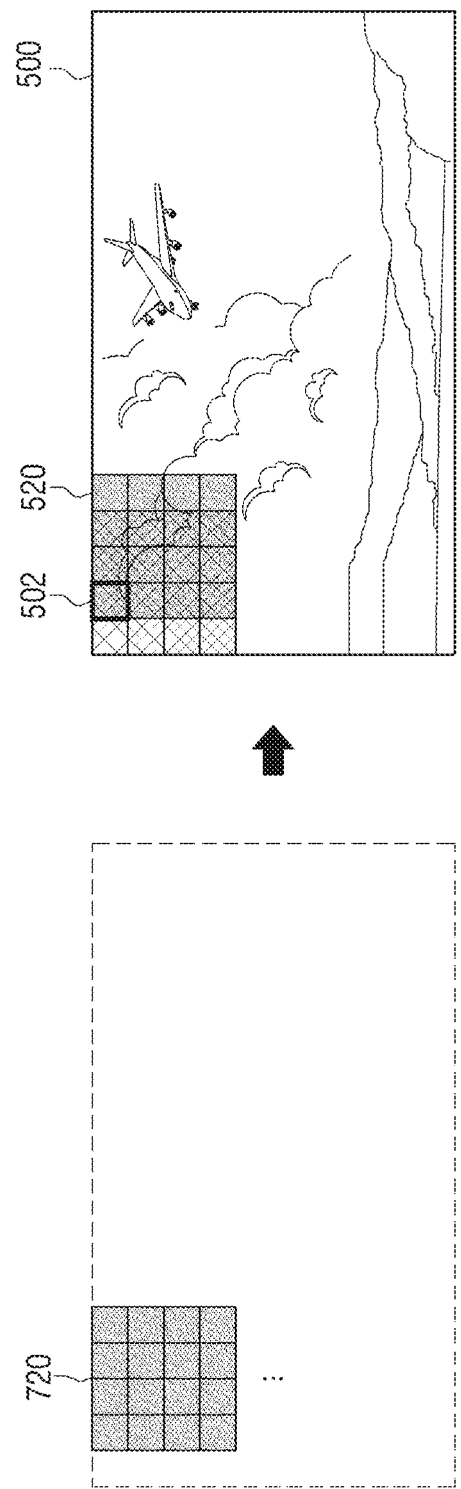
FIG. 7B is a view provided to describe a method for obtaining an output image according to still another embodiment.

FIGS. 7A and 7B are views provided to describe a method for obtaining an output image according to another embodiment.

In FIGS. 7A and 7B, a method of generating a texture patch corresponding to the target pixel area as illustrated in FIG. 6A and then applying the texture patch to an input image 500 is described for convenience of description.

As shown in FIGS. 7A and 7B, after applying a first texture patch 710 corresponding to the first target pixel block 510 to the corresponding pixel block, a second texture patch 720 corresponding to the second target pixel block 520 may be applied to the corresponding pixel block. In this case, the first target pixel block 510 and the second target pixel block 520 may be identified by at least one pixel unit. For example, a first target pixel block 510 (e.g., a 4 * 4 size) may be identified so that the pixel 501 at a position of (1,1) in the input image 500 is included in the position (1,1) of the target pixel block, and the second target pixel block 520 may be identified so that the pixel 502 at a position of (1, 2) in the input image 500 is included in the position (1,1) of the target pixel block. It is understood that one or more other embodiments are not limited thereto. For example, it is also possible that the first target pixel block (e.g., 4*4 size) is identified so that the pixel at a position (1,1) in the input image 500 is included in the position (1,1) of the target pixel block, and the second target pixel block may be identified so that the pixel at a position (1,3) of the input image 500 is included in the position (1,1) of the target pixel block.

Returning to FIG. 2, in accordance with another embodiment, when the texture patch is obtained, the processor 120 may apply frequency filtering to the texture patch, and apply the texture patch applied with the frequency filtering to the target pixel block. That is, the processor 120 may transform the frequency range of the texture patch by applying frequency filtering before adding the texture patch to the input image. For example, the processor 120 may generate a high frequency texture using a high-pass filter, and a low frequency texture using a low-pass filter. The following Equation 3 shows a process of obtaining the output image O by adding the filtered texture (Filter T) to the input image I:

$$O=I+\text{Filter}(T)$$

For example, the processor 120 may apply a low-pass filter such as Gaussian bluffing (or Gaussian filtering) to the texture patch. The Gaussian bluffing is a method of blurring using a Gaussian filter based on a Gaussian probability distribution. When the Gaussian filter is applied to the texture patch, high frequency components are blocked and bluffing process is performed.

Figure 8A:
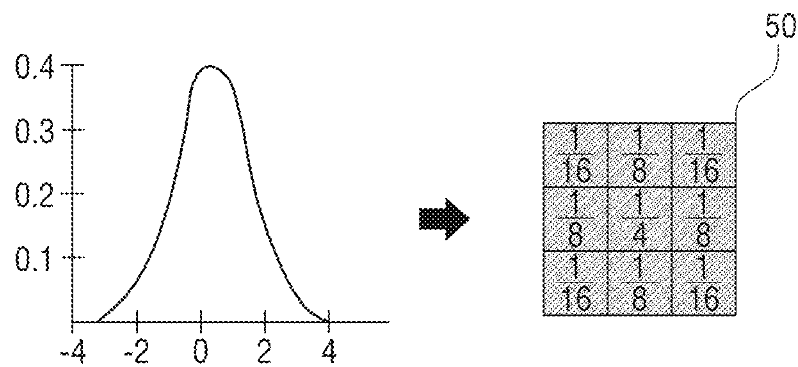
FIG. 8A is a view provided to describe a Gaussian filter according to an embodiment.
Figure 8B:
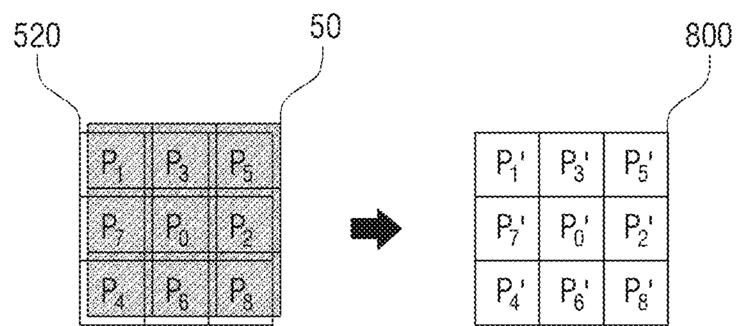
FIG. 8B is a view provided to describe a method for processing Gaussian bluffing on a texture patch according to an embodiment.
Figure 8C:
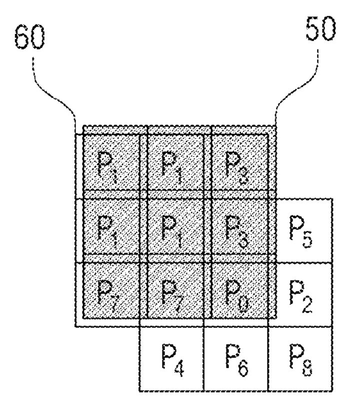
FIG. 8C is a view provided to describe a method for processing Gaussian bluffing on a texture patch according to an embodiment.

FIGS. 8A to 8C are views provided to describe a blurring method for a texture patch according to an embodiment. For convenience of description, it is assumed that the texture patch is in a 3*3 format, although it is understood that one or more other embodiments are not limited thereto.

For example, the Gaussian filter may have a form in which the weight may be large (or relatively large) at 0 (zero) on an X-axis and the weight may be decreasing toward +/− sides, as illustrated in FIG. 8A. When the Gaussian filter is applied to a 3*3 mask 50, the weight may be large in the center of the mask 50 and the weight may be decreasing toward an edge of the mask 50. The numerical value illustrated in FIG. 8A is merely exemplary and one or more other embodiments are not limited thereto. For example, the filtering numerical value may be changed according to a sigma value of the Gaussian function.

The processor 120 may perform Gaussian bluffing processing on the texture patch 520 by applying the Gaussian mask 50 to each pixel value included in the texture patch 520 as illustrated in FIG. 8B. For example, the processor 120 may perform filtering on each pixel value while moving the Gaussian mask 50 in such a manner that each pixel value included in the texture patch 520 is located in the center of the Gaussian mask 50.

In this case, the processor 120 may perform filtering on the pixel values located in a boundary of the texture patch 520 based on mirrored pixel values for the pixel values located in the boundary of the texture patch 520. For example, when filtering is performed by locating the pixel value (for example, P1) at a (1,1) position of the texture patch 520 in the center of the Gaussian mask 50, the processor 120 may generate a virtual second patch 60 centering about the P1 value by mirroring the pixel values in the boundary positions and then perform filtering by locating the P1 value to the center of the Gaussian mask 50 as illustrated in FIG. 8C.

Accordingly, the processor 120 may obtain a bluffed texture patch 800 by performing Gaussian filtering on all the pixels included in the texture patch 520.

The above-described image processing process, that is, texture improvement process, may be performed before or after image scaling, according to various embodiments. For example, the above-described image processing may be performed after scaling for enlarging the low resolution image to the high resolution image or the above-described image processing may be performed in the process of decoding a compressed image before the scaling.

Figure 9:
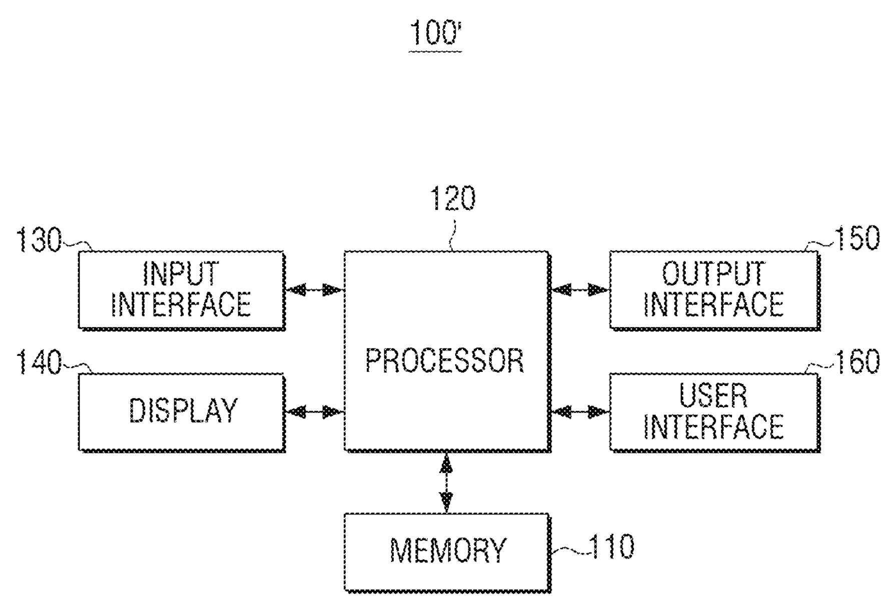
FIG. 9 is a block diagram illustrating a configuration of an image processing apparatus according to still another embodiment.

FIG. 9 is a block diagram illustrating a configuration of an image processing apparatus 100' according to another embodiment. Referring to FIG. 9, an image processing apparatus 100' may include the memory 110, the processor 120, an input interface 130, a display 140, an output interface 150, and a user interface 160. Detailed description for a configuration of FIG. 9 that is the same as or similar to the configuration illustrated in FIG. 2 may be omitted below.

According to an embodiment, the memory 110 may be implemented as a single memory that stores data generated from various operations.

According to another embodiment, the memory 110 may be configured to include a plurality of memories, e.g., first to third memories.

The first memory may store at least a part of the images input through the input interface 130. In particular, the first memory may store at least a part of the area of the input image frames. In this case, at least a part of the area may be an area for performing image processing according to an embodiment. According to an embodiment, the first memory may be implemented as an N line memory. For example, the N line memory may be a memory having a capacity equivalent to 17 lines in the vertical direction, but is not limited thereto. By way of example, when a Full HD image of 1080p (resolution of 1,920×1,080) is input, only the image area of 17 lines in the Full HD image is stored in the first memory. The reason why the first memory is implemented as the N line memory and only a part of the area of the input image frames is stored for image processing is because the memory capacity of the first memory is limited according to hardware limitations. For this reason, according to an embodiment, the first memory may store only an image area of a predetermined number of lines of the inputted image frames, perform image processing, store image areas delayed by at least one line, and perform continuous image processing while storing the delayed image area.

The second memory may be a memory configured to store the acquired random patch, texture patch, or the like. The second memory may be implemented with memories having various sizes according to various embodiments. For example, when all the texture components corresponding to the pixel values of the input image are obtained and stored and then applied to the input image, the second memory may be implemented to have a size equal to or larger than the size of the input image. In another embodiment, when the texture components are applied in image units corresponding to the size of the first memory or the texture components obtained in pixel lines are applied in pixel line units, the second memory may be implemented to have a size suitable for the corresponding image processing.

The third memory may be a memory in which an output image that is image-processed by applying the obtained texture components is stored and may be implemented with memories having various sizes according to various embodiments. For example, when the output image is obtained and displayed by applying all the texture components corresponding to the pixel values of the input image according to an embodiment, the third memory may be implemented to have a size equal to or greater than the size of the input image. In another embodiment, when the image is output in image units corresponding to the size of the first memory or the image is output in pixel line units, the third memory may be implemented to have a size suitable for the corresponding image storage.

When the output image is overwritten in the first memory or the second memory or when the output image is directly displayed without storing, the third memory may be omitted or not used.

The input interface 130 receives various types of contents, such as image signals. For example, the input interface 130 may receive an image signal in a streaming or downloading manner from an external apparatus (for example, a source apparatus), an external storage medium (for example, universal serial bus (USB)), an external server (for example, a website or cloud storage), and the like through a communication method such as access point (AP)-based wireless local area network (LAN) (WiFi™), Bluetooth, Zigbee, wired/wireless LAN, wide area network (WAN), Ethernet, IEEE1394, high definition multimedia interface (HDMI), mobile high definition link (MHL), universal serial bus (USB), display port (DP), Thunderbolt, video graphics array (VGA) port, RGB port, d-subminiature (D-SUB), digital visual interface (DVI), and the like. Here, the image signal may be a digital signal, but is not limited thereto.

The display 140 may be implemented as various formats such as a liquid crystal display (LCD), an organic light-emitting diode (OLED), Light-Emitting Diode (LED), micro LED, Liquid Crystal on Silicon (LCoS), Digital Light Processing (DLP), quantum dot (QD) display panel, plasma display panel, quantum dot display, and the like.

The output interface 150 may output an audio signal.

For example, the output interface 150 may convert a digital audio signal processed in the processor 120 to an analog audio signal and amplify and output the analog audio signal. The output interface 150 may include at least one speaker, a digital to analog (D/A) converter, an audio amplifier, and the like that can output at least one channel. For example, the output interface 150 may include an L channel speaker to reproduce an L channel, and an R channel speaker to reproduce an R channel. However, it is understood that one or more other embodiments are not limited thereto and the output interface 150 may be implemented in various forms. In another example, the output interface 150 may be implemented in a sound bar form that reproduces the L channel, the R channel, and the center channel.

The user interface 160 may be implemented as a device such as a button, a touch pad, a mouse, and a keyboard, or a touch screen or a remote control receiver capable of performing the above-described display function and operation input function. The button may be various types of buttons such as a mechanical button, a touch pad, a wheel, and the like formed in an arbitrary area such as a front surface portion, a side surface portion, and a back surface portion of the main body of the image processing apparatus 100.

Figure 10:
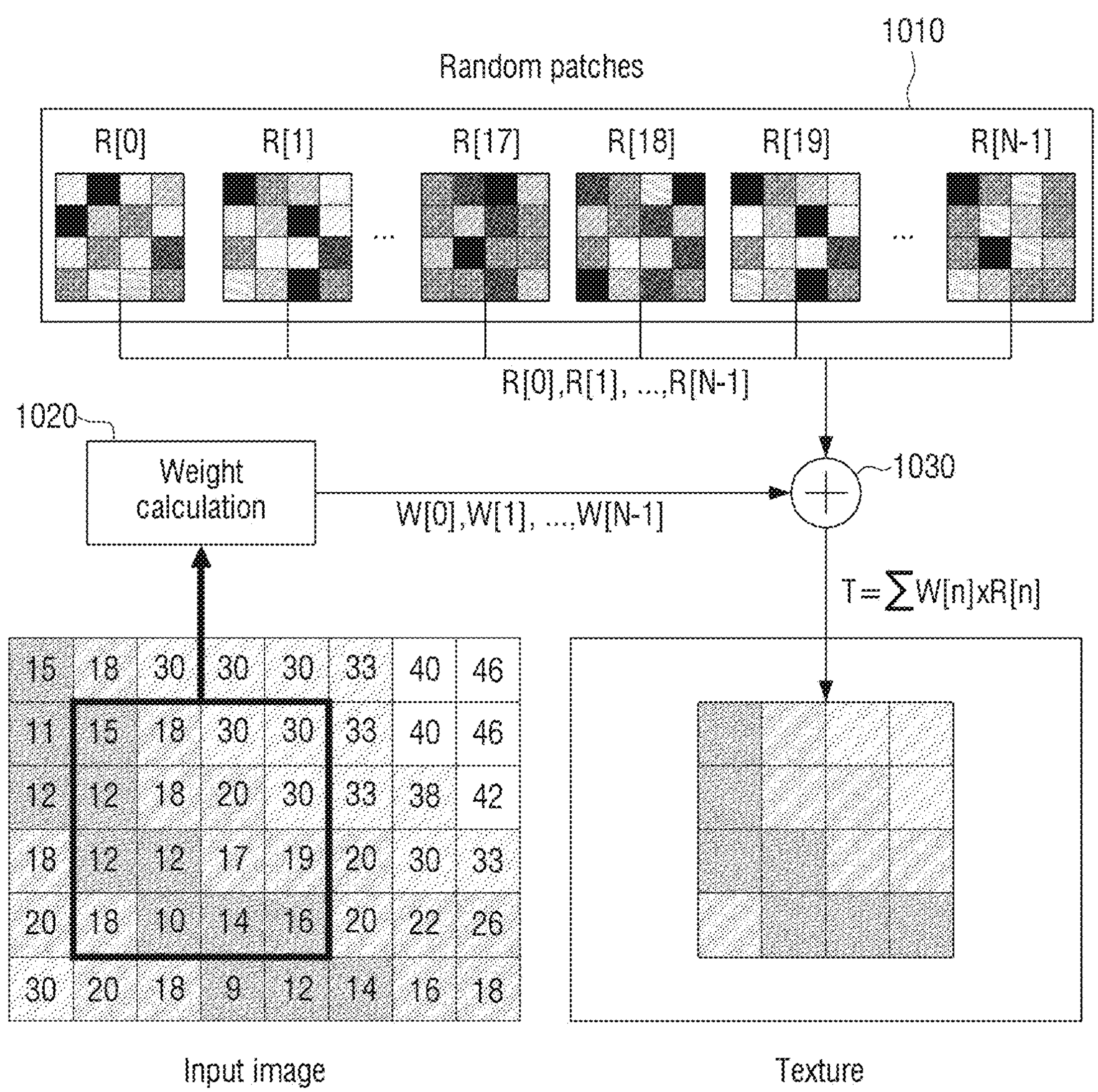
FIG. 10 is a view provided to describe a method for generating a texture according to an embodiment.

FIG. 10 is a view provided to describe a method for generating a texture according to an embodiment.

Referring to FIG. 10, first, a plurality of random patches are obtained (1010). Here, each of the plurality of random patches includes a plurality of pseudo random numbers, and an average of the plurality of pseudo random numbers included in each random patch may be 0.

Based on correlation between the input patch (target pixel block) included in the input image and each of the plurality of random patches, the weight corresponding to each random patch is calculated (1020).

By applying the weight to each of the plurality of random patches and adding the weighted random patches (1030), a texture component corresponding to the input patch may be generated.

It is understood that pre-filtering to remove noise of an input image may also be applied before image processing according to an embodiment. For example, it is possible to remove a noticeable noise by applying a smoothing filter such as a Gaussian filter, a guided filter for filtering the input image against a preset guidance, and the like.

Figure 11:
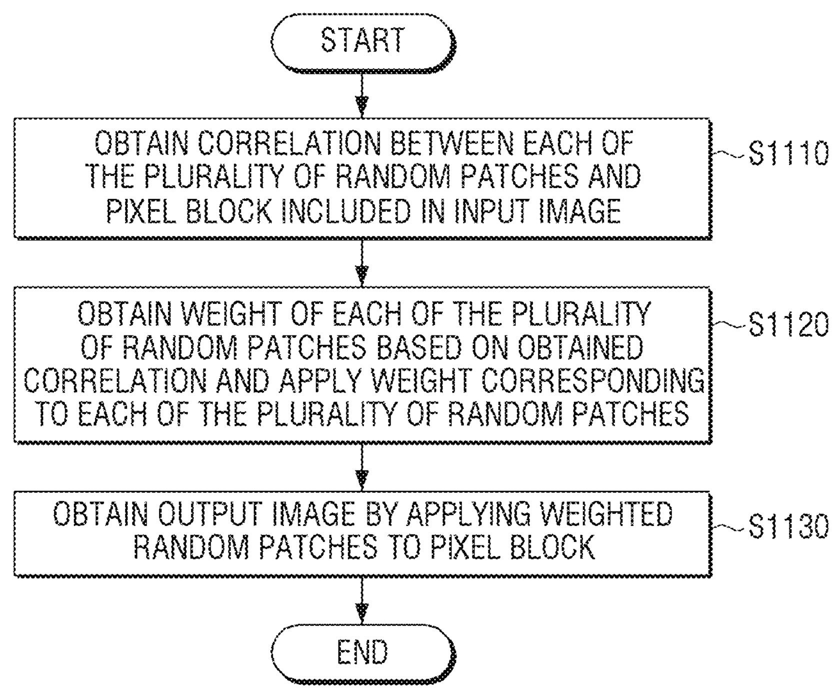
FIG. 11 is a flowchart to describe an image processing method according to an embodiment.

FIG. 11 is a flowchart to describe an image processing method according to an embodiment.

Referring to FIG. 11, a correlation between each of a plurality of random patches obtained from information on at least one random patch and pixel blocks included in the input image is obtained in operation S1110.

A weight for each of the plurality of random patches is obtained based on the obtained correlation, and the weight corresponding to each of the plurality of random patches is applied to the corresponding random patches in operation S1120.

An input image may be obtained by applying a weighted random patch to pixel blocks in operation S1130.

Here, each of the plurality of random patches includes a plurality of pseudo random numbers, and the average of the plurality of pseudo random numbers included in each random patch may be 0.

Also, at least a part of the plurality of pseudo random numbers may include positive pseudo random numbers generated by adding at least one integer selected from an integer set consisting of 0 and 2^n (n≥0), and the remainder out of the plurality of pseudo random numbers may include negative pseudo random numbers having the same absolute value as positive pseudo random numbers.

In addition, the information on at least one random patch may include a plurality of pseudo random numbers to be used for generating one random patch. In this case, the image processing method may further include an operation of obtaining a plurality of random patches by changing the order of the plurality of pseudo random numbers.

Also, in operation S1120 of applying the weight, a first weight may be obtained based on the correlation between the pixel block and the first random patch, a second weight may be obtained based on the correlation between the pixel block and the second random patch, the first random patch may be multiplied by the first weight, and the second random patch may be multiplied by the second weight. In this case, in operation S1130 of obtaining the output image, the output image may be obtained by applying the first random patch multiplied by the first weight and the second random patch multiplied by the second weight to the pixel block.

Also, in operation S1130 of obtaining an output image, the first random patch may be applied to the pixel block so that the random value at the first position included in the first random patch is added to the first pixel included in the pixel block, and the second random patch may be applied to the pixel block so that the random value at the same position as the first position included in the second random patch is added to the first pixel included in the pixel block.

Also, in operation S1130 of obtaining an output image, the first random value included in the first random patch multiplied by the first random value may be added to the second random value at the same position as the first random value included in the second random patch multiplied by the second weight, and the third random value included in the first random patch multiplied by the first weight may be added to the fourth random value at the same position as the third random value included in the second random patch multiplied by the second weight, to obtain the texture patch and obtain an output image by applying the texture patch to the pixel block.

In operation S1130 of obtaining an output image, the frequency filtering may be applied to the obtained texture patch, the texture patch applied with the frequency filtering may be applied to the pixel block, and the output image may be obtained.

According to the above-described various embodiments, a fineness of an image may be improved through texture generation with respect to the texture-lost image due to image enlargement and/or image compression and the like. In addition, it is possible to prevent side effects such as ringing that may occur when a random patch is used without considering the correlation. In addition, it is possible to use less memory space compared with the case of storing random patches based on the number of bits of image (for example, 256 for 8-bit image). It is possible to generate a rich texture compared to a case where only one random patch is added, with respect to one target pixel block.

The various embodiments may be applied to the image processing apparatus as well as any electronic apparatus that may perform image processing including an image receiving apparatus such as a set-top box, an image processing apparatus, and the like.

The above-described various embodiments may be implemented in a computer- or similar device-readable recording medium using software, hardware, or a combination thereof In some embodiments, one or more embodiments described herein may be implemented with the processor 120 itself Through the software implementation, elements such as a procedure and function described herein may be implemented with separate software modules. The software modules may perform one or more functions and operations described herein.

Computer instructions for performing a processing operation of the image processing apparatus 100 according to the above-described various embodiments may be stored in a non-transitory computer-readable medium. The computer instructions stored in the non-transitory computer-readable medium may allow a specific apparatus to perform the processing operation in the image processing apparatus 100 according to the above-described embodiments when the computer instructions are executed through a processor of the specific apparatus.

The non-transitory computer-recordable medium is not a medium configured to temporarily store data such as a register, a cache, or a memory but an apparatus-readable medium configured to semi-permanently store data. Specifically, the non-transitory apparatus-readable medium may be a compact disc (CD), a digital versatile disc (DVD), a hard disc, a Blu-ray disc, a universal serial bus (USB), a memory card, a read only memory (ROM), and the like.

The foregoing embodiments and advantages are merely exemplary and are not to be construed as limiting the disclosure. The present teaching can be readily applied to other types of apparatuses. Also, the description of embodiments is intended to be illustrative, and not to limit the scope of the claims, and many alternatives, modifications, and variations will be apparent to those skilled in the art. While one or more embodiments have been described with reference to the figures, it will be understood by those of ordinary skill in the art that various changes in form and details may be made therein without departing from the spirit and scope as defined by the following claims and their equivalents.

What is claimed is:

1. An image processing apparatus comprising:

a memory storing information on at least one random patch; and at least one processor configured to:

obtain a first random patch and a second random patch based on the information stored in the memory;

obtain an output image by applying, to a pixel block included in an input image, the first random patch multiplied by a first weight and the second random patch multiplied by a second weight;

apply the first random patch to the pixel block so that a random value at a first position included in the first random patch is added to a first pixel included in the pixel block; and apply the second random patch to the pixel block so that a random value at the first position included in the second random patch is added to the first pixel included in the pixel block, wherein the first weight is obtained based on a correlation between the pixel block and the first random patch, and the second weight is obtained based on a correlation between the pixel block and the second random patch, and wherein the first weight and the second weight are different according to a type of the pixel block.

2. The image processing apparatus of claim 1, wherein:

each of the at least one random patch comprises a plurality of pseudo random numbers; and an average of the plurality of pseudo random numbers included in each of the at least one random patch is zero.

3. The image processing apparatus of claim 2, wherein:

a part of the plurality of pseudo random numbers comprises positive pseudo random numbers selected from an integer set consisting of 0 and 2^n (n≥0); and a remainder of the plurality of pseudo random numbers comprises negative pseudo random numbers having absolute values equivalent to the positive pseudo random numbers.

4. The image processing apparatus of claim 1, wherein:

the information on the at least one random patch comprises a plurality of pseudo random numbers to be used for generating one random patch; and the at least one processor is further configured to obtain the at least one random patch by changing an order of the plurality of pseudo random numbers used in the generated one random patch.

5. The image processing apparatus of claim 1, wherein the at least one processor is further configured to:

obtain a texture patch by adding a first random value included in the first position of the first random patch multiplied by the first weight and a second random value at the first position of the second random patch multiplied by the second weight, and adding a third random value included in a second position of the first random patch multiplied by the first weight and a fourth random value included in the second position of the second random patch multiplied by the second weight; and obtain the output image by applying the texture patch to the pixel block.

6. The image processing apparatus of claim 5, wherein the at least one processor is further configured to obtain the output image by applying frequency filtering to the obtained texture patch and applying, to the pixel block, the texture patch to which the frequency filtering is applied.

7. The image processing apparatus of claims 1, wherein the output image is a 4K ultra high definition (UHD) image or an 8K UHD image.

8. The image processing apparatus of claim 1, further comprising:

a display, wherein the at least one processor is further configured to control the display to display the output image.

9. An image processing method of an image processing apparatus, the method comprising:

obtaining a first random patch and a second random patch based on the information stored in the memory;

obtaining an output image by applying, to a pixel block included in an input image, the first random patch multiplied by a first weight and the second random patch multiplied by a second weight;

applying the first random patch to the pixel block so that a random value at a first position included in the first random patch is added to a first pixel included in the pixel block; and applying the second random patch to the pixel block so that a random value at the first position included in the second random patch is added to the first pixel included in the pixel block, wherein the first weight is obtained based on a correlation between the pixel block and the first random patch, and the second weight is obtained based on a correlation between the pixel block and the second random patch, and wherein the first weight and the second weight are different according to a type of the pixel block.

10. The image processing method of claim 9, wherein:

each of a plurality of random patches comprises a plurality of pseudo random numbers; and an average of the plurality of pseudo random numbers included in each of the plurality of random patches is zero.

11. The image processing method of claim 10, wherein:

a part of the plurality of pseudo random numbers comprises positive pseudo random numbers selected from an integer set consisting of 0 and 2^n (n≥0); and a remainder of the plurality of pseudo random numbers comprises negative pseudo random numbers having absolute values equivalent to the positive pseudo random numbers.

12. The image processing method of claim 9, wherein:

the information on at least one random patch comprises a plurality of pseudo random numbers to be used for generating one random patch; and the method further comprises obtaining a plurality of random patches by changing an order of the plurality of pseudo random numbers used in the generated one random patch.

13. The image processing method of claim 9, wherein the method further comprises:

obtaining a texture patch by adding a first random value included in the first position of the first random patch multiplied by the first weight and a second random value at the first position of the second random patch multiplied by the second weight, and adding a third random value included in a second position of the first random patch multiplied by the first weight and a fourth random value included in the second position of the second random patch multiplied by the second weight; and obtaining the output image by applying the texture patch to the pixel block.

14. The image processing method of claim 13, wherein the method further comprises:

obtaining the output image by applying frequency filtering to the obtained texture patch and applying, to the pixel block, the texture patch to which the frequency filtering is applied.

15. The image processing method of claims 9, wherein the output image is a 4K ultra high definition (UHD) image or an 8K UHD image.

16. A non-transitory computer-readable recording medium that stores computer instructions that allow an image processing apparatus configured for restoring a texture component of an input image to perform operations when the computer instructions are executed through a processor of the image processing apparatus, the operations comprising:

obtaining a first random patch and a second random patch based on the information stored in the memory;

obtaining an output image by applying, to a pixel block included in an input image, the first random patch multiplied by a first weight and the second random patch multiplied by a second weight;

applying the first random patch to the pixel block so that a random value at a first position included in the first random patch is added to a first pixel included in the pixel block; and applying the second random patch to the pixel block so that a random value at the first position included in the second random patch is added to the first pixel included in the pixel block, wherein the first weight is obtained based on a correlation between the pixel block and the first random patch, and the second weight is obtained based on a correlation between the pixel block and the second random patch, and wherein the first weight and the second weight are different according to a type of the pixel block.

* * * * *